United States Patent [19]

Schmitz

[11] Patent Number: 5,766,120
[45] Date of Patent: Jun. 16, 1998

[54] CALENDER ROLLER HAVING A CYLINDRICAL BASE BODY

[75] Inventor: Christian Wimmar Schmitz, Kempen, Germany

[73] Assignee: Voith Sulzer Finishing GmbH, Krefeld, Germany

[21] Appl. No.: 617,019

[22] Filed: Mar. 18, 1996

[30] Foreign Application Priority Data

Mar. 29, 1995 [DE] Germany ............... 195 11 595.3

[51] Int. Cl.$^6$ ........................................ D21F 3/10
[52] U.S. Cl. ........................ 492/26; 492/40; 492/50
[58] Field of Search ..................... 492/20, 26, 40, 492/50, 53, 28

[56] References Cited

U.S. PATENT DOCUMENTS

| | | | |
|---|---|---|---|
| 3,235,940 | 2/1966 | Taylor et al. | 492/40 |
| 3,291,039 | 12/1966 | Christie | 492/40 |
| 3,568,286 | 3/1971 | Cross | 492/50 |
| 3,590,453 | 7/1971 | Bryand | 29/121 |
| 3,662,446 | 5/1972 | Walls | 492/540 |
| 3,711,913 | 1/1973 | Galeone et al. | |
| 3,907,232 | 9/1975 | Odermatt | |
| 4,287,649 | 9/1981 | Kohler | 492/56 |
| 4,317,270 | 3/1982 | Watanabe et al. | 492/50 |
| 4,841,613 | 6/1989 | Beery et al. | 492/50 |
| 5,097,596 | 3/1992 | Hoogesteger et al. | |
| 5,387,451 | 2/1995 | Miller | |
| 5,411,463 | 5/1995 | Brookstein | 492/50 |
| 5,415,612 | 5/1995 | Carlson et al. | 492/56 |

FOREIGN PATENT DOCUMENTS

| | | |
|---|---|---|
| 23 42 421 | 4/1981 | Germany . |
| 44-16632 | 7/1944 | Japan . |
| 62-23897 | 2/1962 | Japan . |
| 48-11281 | 4/1973 | Japan . |
| 57-32246 | 7/1982 | Japan . |
| 2-62637 | 12/1990 | Japan . |
| 2061455 | 5/1981 | United Kingdom . |

*Primary Examiner*—Irene Cuda
*Attorney, Agent, or Firm*—Darby & Darby

[57] ABSTRACT

A calender roller includes a cylindrical base body. The base body has a thin circumferential wall, which is not self-supporting, and a support structure made of a thin-wall cellular material is disposed inside of the circumferential wall. At least a part of the walls which form the cells extend approximately in a radial direction, to provide a strong and light calender roller.

26 Claims, 2 Drawing Sheets

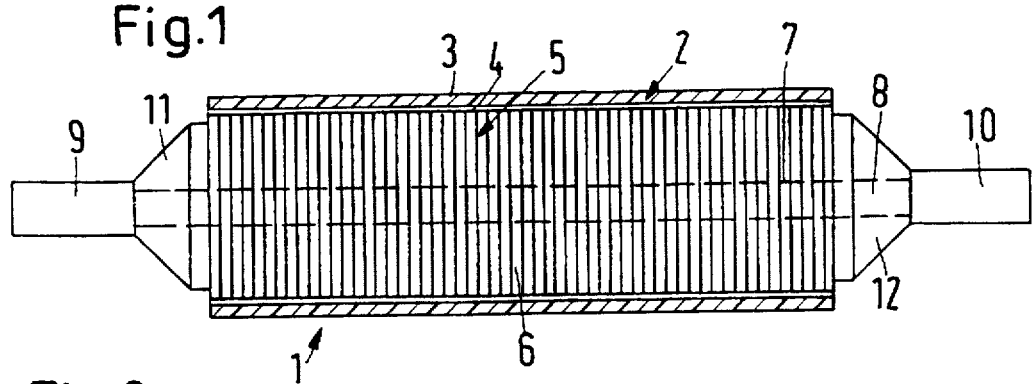
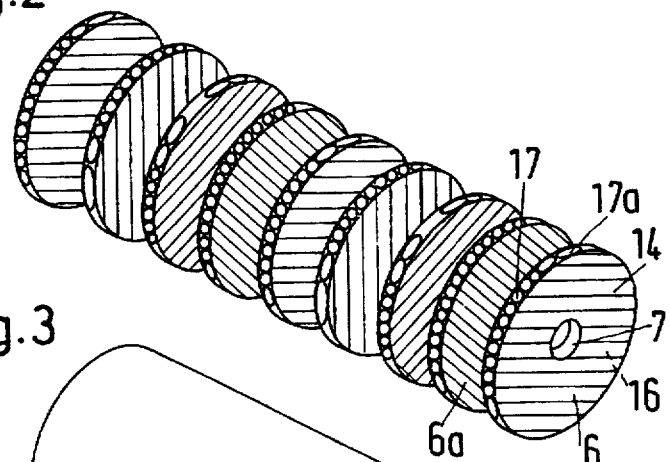
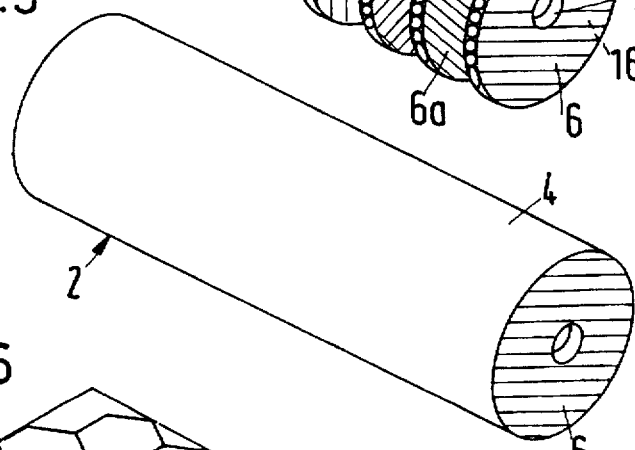
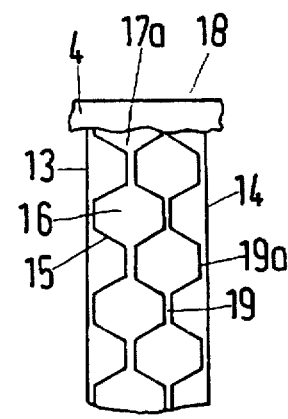
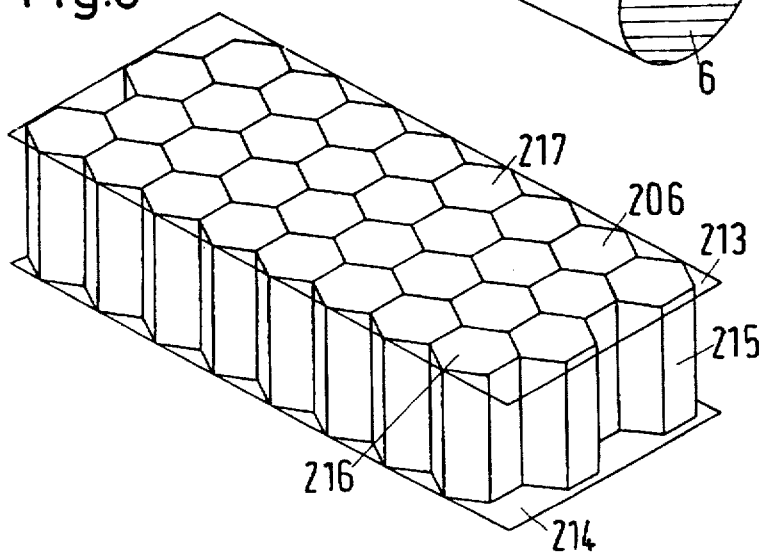
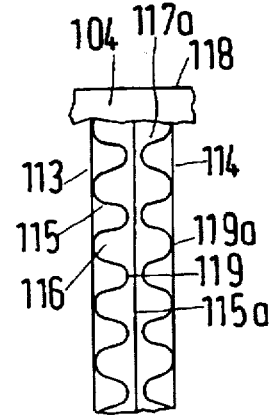

CALENDER ROLLER HAVING A CYLINDRICAL BASE BODY

BACKGROUND OF THE INVENTION

1. Field of the Invention

The present invention relates to a calender roller having a cylindrical base body. More specifically, the present invention relates to a calender roller having a cylindrical base body and a flexible outer covering.

2. Discussion of the Related Art

Rollers that are used in calenders for treating a web of paper are known. The calender typically has at least one roller stack that can be loaded by a force acting on one of the ends of the stack. The calender rollers affect the surface structure of the paper web, such as the smoothness, gloss, thickness and the bulk. However, calenders can also be used to treat other materials, such as plastic films, webs of textiles, etc. A working nip is formed between the juncture of one hard roller and one soft roller. A soft roller has a flexible outer covering and primarily provides for uniform compression of the paper. A hard roller has a hard outer surface and is primarily responsible for affecting the surface structure.

Known calender soft rollers have a base body in the form of a solid or hollow cylinder which is designed to be strong enough to absorb the forces that arise during calendering operations. Such a conventional roller is very heavy, which is undesirable for a variety of reasons. For example, problems arise due to the roller weight during transport and because of the high material costs. In addition, in a calender having a roller stack, the line load in the working nips increases from the top to the bottom because of the weight of the rollers lying above the nip. Therefore, the upper nips have a lower line load than the lower nips. Of course, it is desirable for the line load in the upper nips to closely approximate the line loads in the lower nips.

SUMMARY OF THE INVENTION

It is an object of the present invention to provide a calender roller that has sufficient strength yet is at a lower weight than conventional rollers.

In accordance with a preferred embodiment demonstrating further objects, features and advantages of the present invention, the roller has a base body having a thin circumferential wall which is not, by itself, self-supporting. A support structure is connected to the inside of the circumferential wall to support the circumferential wall. The support structure is made of a thin wall cellular material. At least a portion of the walls that form the cells extend in an approximate radial direction.

The circumferential wall, which has been stiffened by the support structure, is able to absorb the forces that arise during the operation of a calender roller. This is especially true for radial forces, which are transmitted by the walls and are applied in an approximately radial direction. Such a structure provides a very strong calender roller that has a very low weight and is therefore particularly suitable for use in a calender roller stack.

The cells are preferably formed by a pair of side walls, which extend in the same direction. The side walls are connected, at least on one end, to a cover wall. Therefore, the cells are substantially completely closed. The cells are extraordinarily stiff because they are fixed in place at their ends by the cover wall. In addition, the cells are prevented from deforming due to their connection to adjacent walls.

The support structure preferably has a large number of individual elements which are fixedly connected to each other. Because the elements are divided up into a plurality of individual elements, it is possible to vary, from one element to the next, the direction that the side walls extend. Therefore, the support structure is especially well adapted to absorb forces that arise during calendering operation.

The present invention permits the cells to be smaller and, therefore, stiffer. The elements are preferably a plurality of round blanks. Each of the cells are disposed between two end walls which extend in radial planes. The end walls are held at a distance from one another by the cells and absorb the radial forces that act on a calender roller. The side walls of the cells also absorb radial forces. Tensile and compressive forces, which act in an axial direction of the roller, are absorbed by the circumferential wall, and by the components of the side walls of the cells which extend in the axial direction. Tensile compressive forces can also be absorbed by additional interior walls that are concentric to the circumferential wall.

The cells of the individual elements preferably extend parallel to each other and to the end walls. Adjacent round blanks are offset at an angle with respect to each other so that the directions of the cells are offset at the same angle with respect to each other. In other words, the cells of one element extend in a direction that is disposed at a predetermined angle with respect to the direction that the cells of the adjacent element extend. The use of the angular offset in the elements provides essentially uniform result in the roller's ability to absorb radial forces over the circumference of the roller.

In another embodiment, the side walls of the cells of the individual elements extend perpendicularly with respect to the end walls to provide an especially good stiffening effect on the round blanks' axial end walls. The end walls are held at a distance from each other by the side walls of the cells.

The round blanks are preferably provided with a center hole so that a roller axle can be inserted into the support structure. The roller axle does not need to contribute to the stiffness of the roller, and can, therefore, be made with a relatively small diameter and a corresponding light weight.

In another preferred embodiment of the present invention, at least one cylindrical (i.e., annular) layer is disposed between the roller axle and the circumferential wall. The layer is made of individual elements, adjacent elements of which are offset in the axial direction. Each element is formed by the cells' side walls, which extend in an approximately radial direction. Therefore, the cells, or more specifically, their side walls, absorb the entire radial loading of the calender roller. The position of the side walls can be matched to any particular circumferential region as is required because of the division of the layer into individual elements. Compressive and tensile forces can be absorbed by the circumferential wall, by additional walls that are concentric to the circumferential wall and by the axial components of the cells' side walls.

The individual elements, which are adjacent to each other in the circumferential direction, are preferably offset from each other in the axial direction. Therefore, problem locations, which could otherwise arise from the individual elements bumping into each other, are eliminated.

The cells preferably have a honeycomb-like shape. The cells have a hexagonal cross-section which, in combination with the adjacent cells and the covering at the ends of the cells, creates an extraordinarily stiff body. Such a honeycomb material is easy to manufacture because it can be comprised of webs which are alternately combined with adjacent webs.

Alternatively, the cells may have a corrugated cardboard-like shape. This shape also provides sufficient stiffness and is inexpensive to manufacture.

The cells are preferably made of a fiber-reinforced plastic. If carbon fibers are used, very high stiffness results together with the lowest possible weight.

The cells are preferably made of an aramid material. In practice, however, other materials, such as paper, cardboard or sheet metal, for example, aluminum sheet, may be used as the cell material. The walls can be connected to one another and to the cover walls, end walls and the circumferential wall by various methods depending upon the material that is being used. In a preferred embodiment, the walls are bonded together. However, the walls may be connected by other processes, such as welding, soldering, and the like.

The circumferential wall is preferably formed by a thin-wall, continuous tube. A continuous tube, by definition, does not have any seams, which results in a smooth, cylindrical surface. In addition, the support structure can be installed into the circumferential wall under prestressed conditions to increase the stiffness of the roller.

In a preferred embodiment, the flexible covering forms the circumferential wall.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a partial cross-sectional view of a calender roller in accordance with the present invention;

FIG. 2 shows a plurality of round blanks from which the support structure of the base body is made;

FIG. 3 is a perspective view of a base body of FIG. 1;

FIG. 4 is a partial cross-sectional view of a round blank;

FIG. 5 is a partial cross-sectional view of another embodiment of a round blank;

FIG. 6 is a segment of a round blank according to yet another embodiment of the present invention;

DETAILED DESCRIPTION OF THE PREFERRED EMBODIMENT

Figure 7:
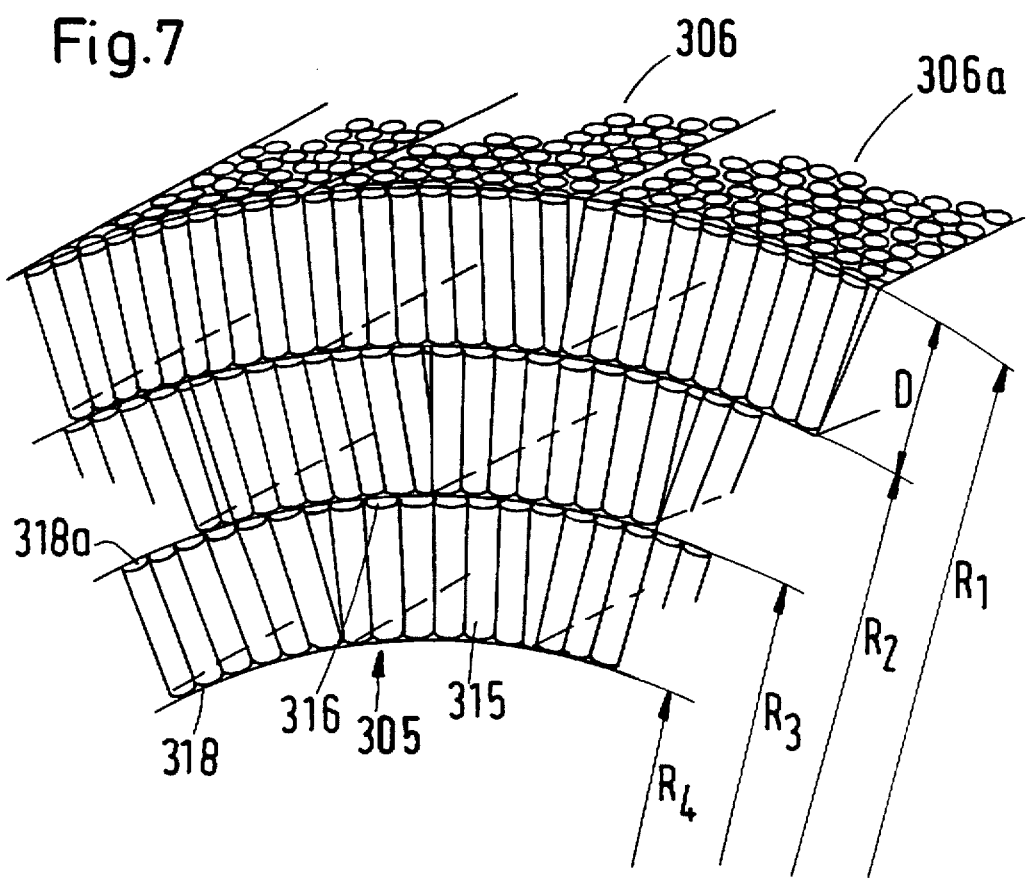
FIG. 7 is a partial cross-sectional perspective view of a support structure according to the present invention.

Referring now to FIG. 1, a roller 1, for use in a calender is illustrated. Roller 1 includes a base body 2 and a covering 3, which is placed about the base body 2. Covering 3 is preferably shrink-fitted onto the base body. Covering 3 is made of flexible plastic, for example, silicone rubber or epoxy resin. The base body 2 has a circumferential wall 4 which is so thin that it is not, by itself, self-supporting. In other words, wall 4 would deform under the forces which occur during normal calender operation if it were not stiffened by a support structure 5, which is placed in the interior of wall 4. Support structure 5 comprises of a number of individual elements 6, in the form of circular round blanks, which each have a central hole 7. A roller axle 8 is placed through the holes 7 of the elements 6. Roller axle 8 connects the two bearing journals 9 and 10 of the calender roller to one another. Roller axle 8 also bears against two thrust pieces 11 and 12. Circumferential wall 4 is a cylindrical tube that is bonded to the support structure 5. Roller axle 8 can also be bonded to the support structure 5.

Referring now to FIGS. 2–4, each round blank 6 has two end walls 13, 14. Side walls 15 are disposed between the two end walls 13, 14. Cells 16 are defined by the side walls 15. The cells 16 for each round blank 6 all extend in the same direction, as can be seen in FIG. 2. The center cell 16 that would extend through a center of the round blank if not for the center hole 7, extends in a radial direction, and the remaining cells of the round blank all extend in a direction that is parallel to the center cell. Therefore, the remaining cells effectively form parallel chords of the circular round blank.

The ends 17 of the cells 16 are bonded to a cover wall 18. In a preferred embodiment the cover wall 18 is formed by the circumferential wall 4. Because circumferential wall 4 surrounds the round blank 6 in a cylindrical fashion, at end 17 (whose cell extends closer to the center), a relatively small surface area is covered by wall 4, while at an end 17a (whose cell extends further away from the center) a relatively large surface area of the cell 16 is covered (See FIG. 2). A larger surface area of end 17a is covered because of the inclined position of its respective cell end relative to wall 18. Cells 16 extend parallel with respect to each other and to the end walls 13, 14.

Adjacent round blanks 6 and 6a are offset at an angle with respect to one another so that the directions of their respective cells 16 are offset at the same angle with respect to each other. As illustrated in FIG. 2, as a result of a uniform angular offset, the effect of the positioning of the cells can be distributed evenly. The end walls of the individual round blanks, which lie against each other as illustrated in FIG. 1, are bonded to each other. During operation, the radial loading is absorbed by the end walls 13 and 14. The radial loading is also absorbed, in part, by the side walls 15 of the cells 16. Compressive or tensile forces that are acting in the axial direction are absorbed by the components of the side walls 15 which extend in the axial direction.

As FIG. 4 schematically shows, the side walls 15 are manufactured from trapezoidally formed webs which form a bonded joint 19 or 19a at every place where they lie against an adjacent side or end wall, respectively.

While FIG. 4 shows a honeycomb-like cellular material, FIG. 5 shows a corrugated cardboard-like cellular material. Reference numbers have been increased by 100 in FIG. 5 from like reference numbers in FIGS. 1–4 with like elements. In essence, the difference between FIG. 4 and FIG. 5 is that the side walls 115 are shaped in a wave-like manners, not trapezoidally as are side walls 15. In addition, a side wall 115a, which is parallel to the end walls 113, 114, is disposed between the side walls 115. Of course, numerous other differences in the cross-sectional shape of the cellular material are possible. For example, the cells could have a square cross-sectional shape.

FIG. 6 illustrates an additional embodiment of the present invention. In this embodiment, the reference numbers have been increased by 200 from like reference numbers in FIGS. 1–4 with like elements. FIG. 6 shows a segment of a round blank 206 that has side walls 215 disposed between two end walls 213, 214. Side walls 215 are perpendicular to the end walls 213, 214. The side walls 215 form hexagonal cells 216 which are bonded at both ends 217 to the end walls 213, 214. The end walls 213, 214 absorb the radial forces. The compressive and tensile forces which are acting axially are absorbed by the side walls 215 and by the circumferential wall, which for the sake of clarity in this drawing figure is not shown.

Figure 8:
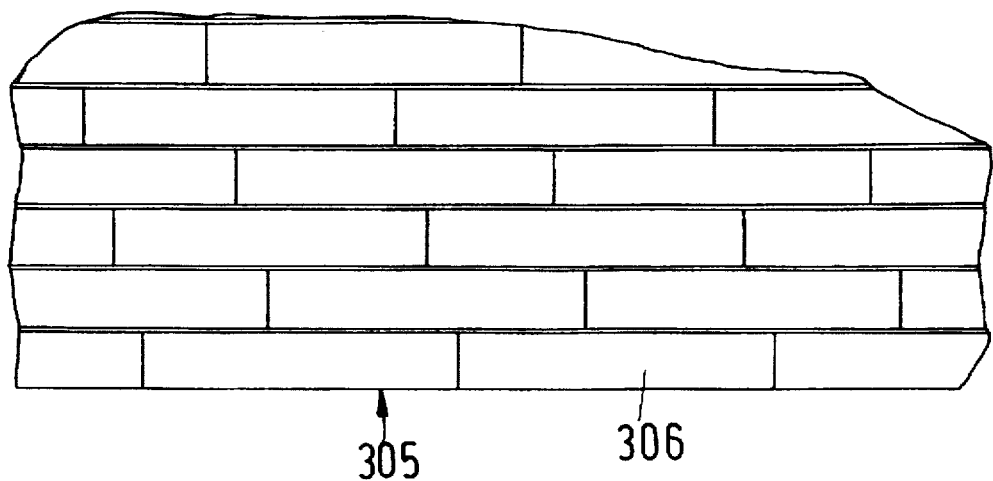
FIG. 8 is a partial exploded view of the circumference of the support structure illustrated in FIG. 7.

FIGS. 7 and 8 illustrate a further embodiment of the present invention, in which the reference numbers have been increased by 300 from like reference numbers in FIGS. 1–4 with like elements. The support structure 305 built up between the roller axle 8 and the circumferential wall 4 consists of individual elements 306. Elements 306 are placed in several annular layers, one above the other, only three layers of which are shown in FIG. 7. In a preferred embodiment, each of the individual elements 306 has an axial length of 50 to 100 cm and extends for an angle of from 10° to 20° in the circumferential direction. Each individual element 306 has its side walls 315 of the individual cells 316 extending approximately radially. The ends of the cells 316 are covered by means of an inner cover wall 318 and an outer cover wall 318a. The cover walls are bonded in a fixed fashion with the adjacent cover wall of the layer that is located above or below it. Individual elements 306 and 306a, which are adjacent to one another in the circumferential direction, are offset with respect to each other in the axial direction (see FIG. 8).

An example of the embodiment illustrated in FIGS. 7 and 8 had a base body 2 having a diameter of 700 mm. A roller axle 8 had a diameter of 200 mm. The support structure had ten layers of elements, with each layer having a radial thickness D=25 mm. The outside radii of the layers, from outside to inside, was:

R1=350 mm
R2=325 mm
R3=300 mm
R4=275 mm, etc.

Of course, the cover walls 318 and 318a were curved in accordance with the radii.

The use of the base body 2, in conjunction with a flexible covering 3, has the advantage that minor irregularities on the surface of the base body 2 are permissible because the flexible material compensates for these imperfections. In an alternative embodiment, the base body can also be used as a carrier for an outer metal layer, so that it is also possible to produce a hard roller having a relatively low weight.

In a preferred embodiment, a plastic, such as an epoxy resin, which is reinforced with glass fibers or, more preferably, with carbon fibers, may be used for the cell material. The preferred ratio of fibers to plastic is 65% to 35%. Alternatively, the cellular material could be made of a fibrous material. The fibrous material is preferably made of an aramid, such as a para-aramid (e.g., KEVLAR™), or a meta-aramid (e.g., NOMEX™), both of which are sold by Du Pont. The sheet material that is used as the starting material preferably consists of between 87% and 99% aramid fiber. Both materials have a relatively high resistance to heat for plastic. As a result, their physical properties are retained even under severe conditions.

The stressed base body has an extremely low weight, extraordinary stiffness and high compressive strength, which provides the following advantages when it is being used as a calender roller. Because of the low weight of the roller package, a steeper curve for the pressure characteristic is achieved in the roller stack of the calender, which results in a lower roller load and lower power requirements. The stiffness prevents any movement of the roller body as a result of tangential forces. The high thermal resistance permits full use of the plastic's physical properties up to temperatures above 300° C. Because a heavy, thick roller axle is not necessary, the weight of the axle is reduced. When the flexible covering is being replaced, only a new, prefabricated covering, in the form of an outer jacket, has to be replaced. The base bodies are maintenance free. The low weight makes handling easier and reduces transport costs.

Having described the presently preferred exemplary embodiment of a calender roller having a cylindrical base body in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A calender roller having a radial dimension and an axial dimension comprising:

a support structure made of a thin wall material, said thin wall material forming a plurality of cells, at least a portion of the walls that form the cells extending in a radial direction, said support structure including a plurality of elements, said plurality of elements being fixedly connected together, each of said elements being comprised of a round blank in which each of said cells is disposed between a pair of end walls which extend in a radial plane;

a thin circumferential wall disposed about said support structure; and a flexible covering disposed about said thin circumferential wall.

2. The calender roller according to claim 1, wherein said cells are formed by a plurality of side walls which all extend in substantially the same direction, said plurality of side walls being connected, at least on one end, to said thin circumferential wall.

3. The calender roller according to claim 1, wherein said cells disposed in each of said elements extend parallel to the direction that said pair of end walls extend, wherein adjacent first and second round blanks are connected together such that said cells of said first round blank extend at an offset angle with respect to said cells of said second round blank.

4. The calender roller according to claim 1, wherein said plurality of side walls extend substantially perpendicularly with respect to said pair of end walls.

5. The calender roller according to claim 1, wherein each of said round blanks has a center hole.

6. The calender roller according to claim 1, wherein said plurality of elements are disposed in at least one radial layer, adjacent ones of said elements in said layer being offset in the axial direction.

7. The calender roller according to claim 6, wherein said cells have a honeycomb shape.

8. The calender roller according to claim 6, wherein said cells have a corrugated shape.

9. The calender roller according to claim 8, wherein said cells are made of a fiber-reinforced plastic.

10. The calender roller according to claim 8, wherein said cells are made of a fibrous material.

11. The calender roller according to claim 10, wherein said fibrous material is an aramid.

12. The calender roller according to claim 11, wherein said thin circumferential wall is a continuous tube.

13. The calender roller according to claim 12, wherein said flexible covering is fixedly connected to said circumferential wall.

14. A calender roller having a radial dimension and an axial dimension comprising:

a support structure made of a thin wall material, said thin wall material forming a plurality of cells, at least a portion of the walls that form the cells extending in a radial direction, said support structure including a plurality of elements, said plurality of elements being fixedly connected together, said plurality of elements being disposed in at least one radial layer, adjacent ones of said elements in said layer being offset in the axial direction;

a thin circumferential wall disposed about said support structure; and a flexible covering disposed about said thin circumferential wall.

15. The calender roller according to claim 14, wherein said cells are formed by a plurality of side walls which all extend in substantially the same direction, said plurality of side walls being connected, at least on one end, to said thin circumferential wall.

16. The calender roller according to claim 14, wherein each of said elements is comprised of a round blank in which each of said cells is disposed between a pair of end walls which extend in a radial plane.

17. The calender roller according to claim 16, wherein said cells disposed in each of said elements extend parallel to the direction that said pair of end walls extend, wherein adjacent first and second round blanks are connected together such that said cells of said first round bland extend at an offset angle with respect to said cells of said second round blank.

18. The calender roller according to claim 16, wherein said plurality of side walls extend substantially perpendicularly with respect to said pair of end walls.

19. The calender roller according to claim 16, wherein each of said round blanks has a center hole.

20. The calender roller according to claim 14, wherein said cells have a honeycomb shape.

21. The calender roller according to claim 14, wherein said cells have a corrugated shape.

22. The calender roller according to claim 21, wherein said cells are made of a fiber-reinforced plastic.

23. The calender roller according to claim 21, wherein said cells are made of a fibrous material.

24. The calender roller according to claim 23, wherein said fibrous material is an aramid.

25. The calender roller according to claim 24, wherein said thin circumferential wall is a continuous tube.

26. The calender roller according to claim 25, wherein said flexible covering is fixedly connected to said circumferential wall.

* * * * *